United States Patent

[11] 3,599,157

[72] Inventor William C. Choate
Plano, Tex.
[21] Appl. No. 732,152
[22] Filed May 27, 1968
[45] Patented Aug. 10, 1971
[73] Assignee Texas Instruments Incorporated
Dallas, Tex.

[54] FEEDBACK MINIMIZED OPTIMUM FILTERS AND PREDICTORS
11 Claims, 12 Drawing Figs.

[52] U.S. Cl. ................................................. 340/172.5
[51] Int. Cl. ................................................. G06f 15/18
[50] Field of Search ........................................ 340/172.5; 235/157

[56] References Cited
UNITED STATES PATENTS
3,267,439 8/1966 Bonner .................... 340/172.5
3,311,895 3/1967 Clapper .................... 340/172.5
3,317,900 5/1967 Clapper .................... 340/172.5

Primary Examiner—Gareth D. Shaw
Assistant Examiner—Sydney Chirlin
Attorneys—Samuel M. Mims, Jr., James O. Dixon, Andrew M. Hassell, Harold Levine, Rene E. Grossman, John E. Vandigriff and Richards, Harris and Hubbard ABSTRACT: A nonlinear adaptive signal processor is provided wherein during a training phase, based upon a prior knowledge of the desired processor response to a given input, the output signal preceding the contemporary value of the output signal is employed in the feedback sense for minimizing storage required of the desired responses of the processor which, when trained, responds as desired to a different input having the same statistics as the input employed in the training phase.

| INPUT VOLTAGE * | | | OUTPUT LINES ** | | | |
|---|---|---|---|---|---|---|
| >V₁ | >V₂ | >V₃ | 41 | 42 | 43 | 44 |
| 0 | 0 | 0 | 1 | 0 | 0 | 0 |
| 1 | 0 | 0 | 0 | 1 | 0 | 0 |
| 1 | 1 | 0 | 0 | 0 | 1 | 0 |
| 1 | 1 | 1 | 0 | 0 | 0 | 1 |

\* 0: "No"  
   1: "Yes"

\*\* 0: ≈ 0 VOLTS  
    1: ≈ $V_{cc}$ VOLTS

FIG. 4

INVENTOR  
WILLIAM C. CHOATE

ATTORNEY

INVENTOR
WILLIAM C. CHOATE

ATTORNEY

FEEDBACK MINIMIZED OPTIMUM FILTERS AND PREDICTORS

This invention relates in general to signal translation and more particularly to feedback minimized optimum filters and predictors and apparatus and methods useful in their determination. The invention provides for the determination and use of an optimal nonlinear signal processor and the application of the same to significant information signals.

Optimal nonlinear processors are highly useful in connection with problems of most challenging nature including identification, control, filtering, smoothing, prediction, modeling, and classification.

Heretofore linear processors have been widely used. The design of optimum linear processors and predictors according to a mean square error criterion is well known in the art. Such systems are theoretically discussed by Norbert Weiner in his work entitled "The Fourier Integral and Certain of its Applications" published in 1933 by Dover Publications Inc. Weiner has also discussed the realization of a nonlinear system. The theoretical aspects of the Weiner theory of nonlinear system characterization may be employed in the manner disclosed in the thesis of Amar G. Bose, Massachusetts Institute of Technology, June, 1956, entitled "A Theory of Nonlinear Systems," reproduced in M.I.T. Research Laboratories of Electronics Technical Report No. 309.

The use of the Weiner theory is further disclosed by Bose in Systems and methods described and claimed in U.S. Pat. No. 3,265,870 issued Aug. 9, 1966 to Bose.

The present invention makes more practical and realizable the Weiner nonlinear processor as implemented by Bose. Applicant provides for minimization of the instrumentation necessary to apply the Weiner-Bose teachings to challenging signal translation problems of the present day in the fields specifically mentioned above (identification.....classification).

The U.S. Pat. No. 3,265,870 to Bose makes clear that, as the complexity of the processor is increased, the number of filter coefficients necessary to specify the processor grows very rapidly. In the Bose patent use was made of Laguere networks. When $s$ Laguere coefficients are employed and $n$ gate functions are used for each coefficient, there are $n^s$ coefficients to evaluate. In the Bose system such coefficients were represented by charges stored on capacitors. Thus the number of coefficients to be so represented is further to be increased when the number of gate functions employed in Bose is increased to quantize into smaller cells the function space of the input signal. Bose pointed out that the latter refinement is desirable from the point of view of reducing the filtering error but that it leads to a very large number of coefficients to evaluate. Bose then indicates steps that might be taken to reduce the number of such coefficients in the case where a priori information is available relative to the character of the input signal.

The present invention relates to minimizing system complexity beyond any level postulated by Bose but without sacrificing the capability of the filter.

In accordance with the present invention an arrangement is employed wherein the processor output signal produced in an output utilization circuit is applied to a unique feedback structure whereby the number of coefficients to be evaluated is reduced. Thus, the improvement characterizing the present invention is appreciable in a numerical sense as well as in actual reduction of the amount of hardware necessary to employ an optimal nonlinear processor. This is accomplished by use of a feedback network wherein at least one signal, the signal $x_{t1}$ which precedes the contemporary value $x_t$ of the processor output, is employed. The use of feedback further reduces the number of training points required in the training phase of operation.

In accordance with the invention successive time samples of an input function $u$ are quantized to produce members of successive groups of address functions for controlling a gating operation which in response to each of the groups will produce an independent gating output signal. The gating output signal related to the contemporary value $u_t$ of the signal $u$ is combined with a second signal $z_t$ representative of the contemporary value of the desired processor response $x_t$ to the input $u$ and with a third signal $-x_{t11}$. The resultant combined signal is stored at the selected address and, further, is normalized and combined with said third signal $-x_{t11}$ to form the processor output signal $x_t$. At the same time the third signal $-x_{t11}$ is quantized to produce a second member of each of the groups of the functions for controlling the gating operation. In general, the input $u_t$, desired output $z_t$, and previous actual output $x_{t11}$ each represent a sample of a single valued time function or a multiplicity of such functions, in which case they may be represented as multicomponent vector quantities.

In a system sense, the processor includes at least a pair of level selectors one of which senses the signal $u$ to provide an output representative of the contemporary value $u_t$ of the signal $u$. A pair of storage arrays are each addressed in one coordinate by one of the level selectors and each is addressed in a second coordinate by the other of the level selectors. Means are provided for summing a desired output signal $z_t$ with the contents of one of said storage arrays at the selected address and with the negative of a third signal $x_{t11}$ for storing at the selected address a condition representative of the sum. Means are provided for normalizing the sum and for combining with the normalized signal the third signal. Means for generating the third signal includes a delay means responsive to the processor output with circuit means for applying the delayed signal to the second of the level selectors.

For a more complete understanding of the present invention and for further objects and advantages thereof, reference may now be had to the following description taken in conjunction with the accompanying drawings in which.

Figure 1:
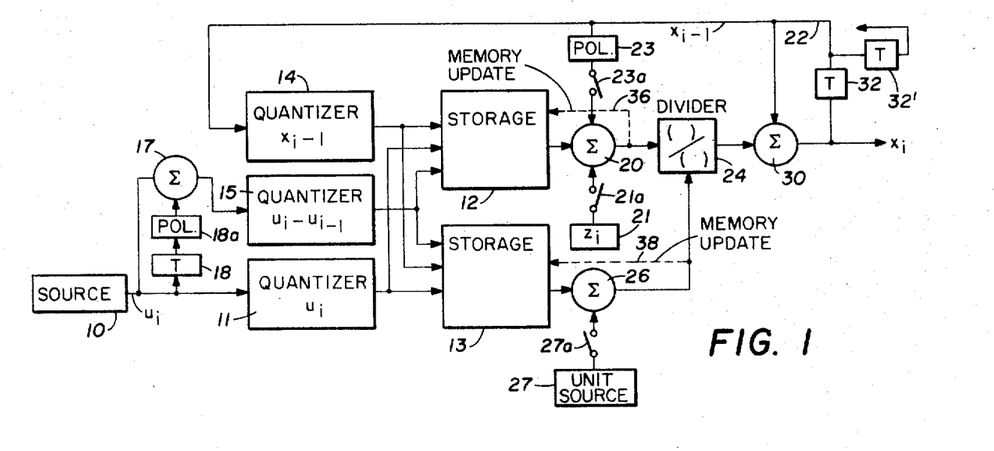
FIG. 1 is a block diagram of an embodiment of the present invention.

The system shown in FIG. 1 provides for nonlinear processor which may be trained for optimum processing of single valued time varying function $u$ characterized by two components $u(t)$ and $[u(t)-u(t-T)]$ in the manner disclosed in the generic sense in the U.S. Pat. No. 3,265,870 to Bose but with provision for reducing the required storage by many orders of magnitude. The use of a bar under a given symbol e.g. $\underline{u}$ herein signifies that the signal so designated is a multicomponent signal, e.g. $u(t)$ and $u(t)-u(t-T)$. The reduction is accomplished through the use of a feedback operation which at any one instant requires only one sample of each of the two components of the input signal $\underline{u}$ and thus materially minimizes the storage problem. As in the Bose patent, the processor is trained in dependence upon some known or assumed function which is a desired output such that the output function $x$ corresponds with $z$ for inputs having statistics similar to $\underline{u}$. Thereafter the processor will respond to signals $\underline{u}'$, $\underline{u}''$, etc. in an optimum manner. In the following description, the training phase will first be discussed following which the changes to carry out operations on signals other than that used for training will be described.

TRAINING

In FIG. 1 the first component of signal $u$ from a source 10 forms the input to a quantizer 11. The output of quantizer 11 is connected to each of a pair of storage units 12 and 13. The storage units 12 and 13 will in general have like capabilities and will both be jointly addressed by signals in the output circuits of the quantizer 11 and quantizers 14 and 15. The storage units 12 and 13 are multielement storage units capable of storing different electrical quantities at a plurality of different addressable storage locations.

Briefly, the third quantizer 15 has been illustrated also addressing both storage units 12 and 13 in accordance with the second component of the signal $u$ derived from source 10, the delay 18 and the inversion unit 18a. More particularly, if the signal sample $u_i$ is the contemporary value of the signal from source 10 then the input applied to quantizer 15 is $u_i - u_{i11}$. This input is produced by applying to a summing unit 17 $u_i$ and the negative of the same signal delayed by one sample increment in the delay unit 18. For such an input, the storage units 12 and 13 may be regarded as three dimensional matrixes of storage elements. In the description of FIG. 1 which immediately follows, the quantizer 15 will be ignored and will be referred to later.

The output of storage unit 12 is connected to an adder 20 along with the output of a unit 21 which is a signal $z_i$, the contemporary value of the desired output signal. A third input is connected to the adder 20 from a feedback channel 22, the latter being connected through an inverting unit 23 which changes the sign of the signal.

The output of adder 20 is connected to a divider 24 to apply a dividend signal thereto.

The divisor is derived from storage unit 13 whose output is connected to an adder 26. A unit amplitude source 27 is also connected at its output to adder 26. The output of adder 26 is connected to the divider 24 to apply the divisor signal thereto. A signal representative of the quotient is then connnected to an adder 30, the output of which is contemporary value $x_i$ the processor output. The adder 30 also has a second input derived from the feedback channel 22. The feedback channel 22 transmits the processor output signal $x_i$ delayed by one unit time interval in the delay unit 32, i.e., $x_{i11}$. The feedback channel 22 also is connected to the input of the quantizer 14 to supply the input signal thereto.

A feedback channel 36 leading from the output of adder 20 to the storage unit 12 is provided to update the storage unit 12. Similarly a channel 38 leading from the output of adder 26 is connected to storage unit 13 and employed to update memory 13.

Briefly and during the training phase and neglecting the presence of quantizer 15, the system operates as will now be described. The contemporary value $u_i$ of the signal $u$ from source 10 is quantized in unit 11 simultaneously with quantization of the preceding output signal $x_{i11}$ (which may initially be zero) by quantizer 14. The latter signal is provided at the output of delay unit 32 whose input-output functions may be related as follows:

$T$ is the delay in seconds,
$x_i = x(iT + t_o)$, and
$x_{i11} = x[(i-1)T + t_o]$,
where $i$ is an integer, $T$ is the sampling interval, and $t_o$ is the time of the initial sample. The two signals thus produced by quantizers 11 and 14 are applied to both storage units 12 and 13 to select in each unit a given storage cell. Stored in the selected cell in unit 12 is a signal representative of previous values of the output of adder 20 as applied to this cell by channel 36. Stored in the corresponding cell in unit 13 is a condition representative of the number of times that that cell has previously been addressed, the contents being supplied by way of channel 38. Initially all signals stored in both units 12 and 13 may be zero. The selected stored signals derived from storage array 12 are applied synchronously to adder 20 along with $z_i$ and $-x_{i11}$ signals.

The contemporary output of adder 20 is divided by the output of adder 26 and the quotient is summed with $x_{i11}$ in adder 30 to produce the contemporary processor response $x_i$. The contemporary value $x_i$ is dependent on the contemporary value $u_i$ of $u$, the contemporary value $z_i$ of the desired output $z$ and negative of $x_{i11}$, i.e.: $(-x_{i11})$, as well as the signals from the addressed storage cells.

It will be found that upon analysis the system functions in a manner which may be described in the following terms involving a differential equation in vector form. A nonlinear system may be characterized by a vector differential equation $$\dot{x} = g(x, u, t) \quad (1)$$

That is, $\dot{x}$ is the time derivative of the signal $x$ and is a vector valued function $g$ of $x$, $u$, and $t$. The function $g$ in a theoretical sense describes the system and may allow the first order vector valued differential equation (1) to represent a system governed by a differential equation of multiorder. In important cases of stationary systems, time does not appear as a parameter of $g$. This will be the case for the systems considered first herein.

By choosing the time increment $T$ sufficient small, the variation of $x(t)$ can be made small in any interval $(t, t-T)$, subject only to reasonable physical constraints. Then Equation (1) can be approximated $$x_i = T\, g(X_{i11}, u_i) + x_{i11} \quad (2)$$

Here the problem is to determine the first element on the right of Equation (2). The feedback provision of the present invention can be shown to proceed for determination of the optimum operation $Tg$ of Equation (2).

The functions above described in connection with the system of FIG. 1 provide the signal $x_i$ automatically.

POST TRAINING OPERATION

The system shown in FIG. 1 establishes voltage conditions which represent the optimum nonlinear processor for treating signals having the same statistics as the signal $z(t)$ upon which the training is based.

After the system has been trained based upon the desired output $z$ over a statistically significant sequence of $u$ and $z$, the switches 21a, 23a and 27a may then be opened and a new input signal $u'$ employed whereupon the processor operates optimally on the signal $u'$ in the same manner as above described but with the three signals $z_i$, $x_{i11}$ and unity no longer needed within the update channels.

In the system as shown in FIG. 1 quantizer 15 provides an output dependent upon the differences between sequential samples $u_i$ and $u_{i11}$, employing a delay unit 18 and a polarity reversal unit 18a. In this system a single delay unit 18 is provided at the input and a single delay unit 32 is provided at the output. In general, more delays could be employed on both input and output. However, physical considerations will generally require that there will not be required more delay units on the input than on the output. Further, if the system is responsive to pass low frequencies selectively, relative to high frequencies, then fewer delays would be required on the input than on the output. In use of the system with quantizer 15, storage units 12 and 13 may conveniently be regarded as three dimensional. Of course, elements of input vector and output vector need not be related by simple time delays as will be subsequently shown in FIG. 6.

Figure 2:
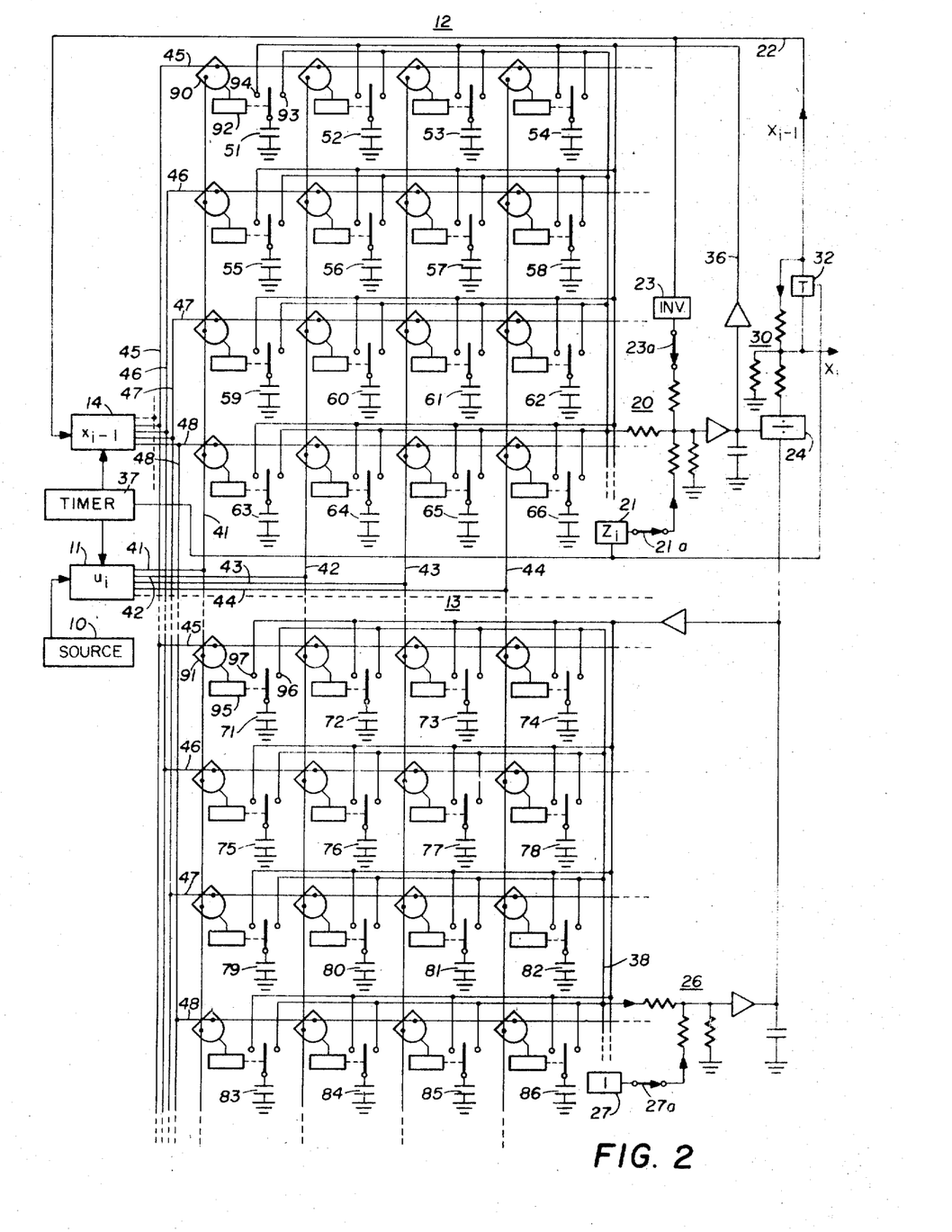
FIG. 2 is a diagram illustrating an analog form of an embodiment of the invention.

FIGURE 2

A more detailed embodiment of the invention is shown in FIG. 2. The third quantizer 15 of FIG. 1 has been eliminated. Storage elements 12 and 13 are depicted as two-dimensional arrays of storage elements in the form of electrical capacitors. Where appropriate, parts of FIG. 2 have been given the same reference characters as in FIG. 1.

In FIG. 2 electrical charges are placed on the capacitors which are, in part, selected by voltage states on lines 41—44 leading from quantizer 11. Lines 41—44 extend vertically through the arrays of storage elements in units 12 and 13. The capacitor selections are then completely specified by voltage states on lines 45—48 leading from quantizer 14. The latter lines extend horizontally through the storage units 12 and 13. Quantizers 11 and 14 operate as disclosed in U.S. Pat. No. 3,265,870 to Bose so that only one of the lines from each quantizer will be energized at any one time. Quantizers 11 and 14 are controlled by a timer 37. Each storage element is provided with control circuits to control the signal to be transmitted from a given capacitor and the charge placed on a given capacitor.

The storage units 12 and 13 are illustrated as comprising a 4×4 array which may form a part of larger arrays as indicated by the dotted terminations of the electrical grid conductors.

In storage unit 12, capacitors 51—66 are employed. In storage unit 13, capacitors 71—86 are employed. One pair of capacitors is selected or addressed each time a sample of the input signal $u_i$ is employed, selection being by the outputs of units 11 and 14. They are addressed by enabling AND gates such as gates 90 and 91. Gates 90 and 91 each have one input connected to bus 41 leading from quantizer 11 and another input connected to bus 45 leading from quantizer 14. The output of gate 90 controls a switch actuator 92 which serves to sequentially cause closure of switch terminal 93 and then switch terminal 94. Similarly, gate 91 controls a switch actuator 95 which operates to close switch terminal 96 and then switch terminal 97. Closure of switch terminal 93 applies the voltage on capacitor 51 to adder 20 each time the AND gate 90 is enabled. Following the latter action, switch terminal 94 is closed to apply to the capacitor an additional charge proportional to the value of the voltage at the input to divider 24 to update the quantity stored on capacitor 51.

Gate 91 is enabled coincident with AND gate 90, thus causing switch terminal 96 to close. This applies voltage to adder 26 proportional to the charge on capacitor 71. Thereafter, switch terminal 96 is opened and switch terminal 97 is closed to update the charge on capacitor 71 by applying thereto a voltage representative of the output of adder 26. The output of adders 20 and 26 are applied to divider 24. The output of divider 24 together with the output of delay unit 32 is then applied to adder 30 whose output is the desired filter output $x_i$. It will be noted that the timer 37 controls the sampling interval in quantizers 11 and 14 and also controls the delay unit 32.

In operation, a voltage is placed on capacitor 51 each time it is addressed during training. Capacitor 51 in the storage unit 12 will have increments of charge supplied thereto each time it is addressed with such increment being dependent upon the quantity $x_{ii1}$ and the value $z_i$.

In contrast, the capacitors in storage unit 13 will be incremented, each time addressed, by a voltage representative of unity, i.e., the signal from source 27. Thus, the summation signal from adder 20 is normalized by dividing the signal by a voltage proportional to the number of times the given storage location has been addressed.

The switching unit represented by unit 92 having terminals 93 and 94 may be a conventional stepping switch which will complete its cycle in response to an input as from gate 90 in a time interval less than the period of the timer 37. Such units are well known and are commonly used.

The system shown in FIG. 2 involves only the two inputs $u_i$ and $x_{ii1}$ for memory addressing purposes and utilizes only a single time delay 32 at the output. Where desired additional inputs can be employed, such as the signal $u_i$—$u_{ii}$ shown in FIG. 1.

An additional feedback with an additional time delay such as the delay 32′ may also be employed to provide a feedback of function $x_{ii2}$. Additional delays may provide $x_{ii3}$, $x_{ii4}$, etc. Thus, while the system of FIG. 2 has been described in detail, it is not intended that the invention be limited to a system where only two quantizers 11 and 14 are employed. An additional quantizer will be employed for each additional input and another quantizer will be employed for each additional feedback function employed.

It will be seen that, as to the input signal, the feedback employed in FIGS. 1 and 2 requires only consideration of the contemporary value of the elements of $u$ and thus permits formulation of a nonlinear processor with minimal storage. It is from this fact that significant advantage over the Bose system is achieved.

Figure 3:
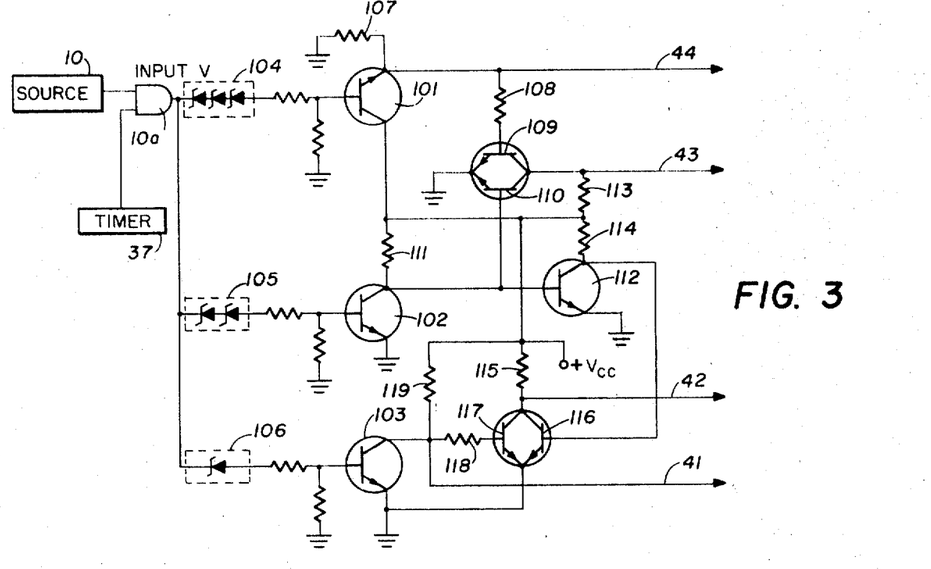
FIG. 3 illustrates a four-level quantizer circuit.

FIGURE 3

The quantizers 11 and 14 may be of the type shown in FIG. 3. For example, if the source 10 is connected by way of an AND gate 10a as controlled by timer 37 then a voltage will be produced on only one of the lines 41—44 depending on the amplitude of the signal at the instant the timer opens gate 10a. The quantizer comprises three input transistors 101, 102 and 103. The bases of transistors 101—103 are signal energized through Zener diode units 104—106, respectively, all of which are connected to the output of gate 10a. The transistor 101 is connected at its emitter through resistor 107 to ground and to line 44. The emitter is also connected by way of resistor 108 to the base of transistor 109 which is connected in parallel with the transistor 110. The emitters of transistors 109 and 110 are connected to ground. The collectors are connected to line 43. The base of transistor 110 is connected to the collector of transistor 102 whose emitter is grounded, and to the base of a transistor 112. Line 43 is connected to the supply source $+Vcc$ by way of resistor 113 and by way of resistor 114 to the collector of transistor 112. The juncture between resistors 113 and 114 is connected to the collector of transistor 101 and, by way of resistor 115, to line 42 which is common to the collectors of transistors 116 and 117. The base of transistor 116 is connected to the collector of transistor 112. The base of transistor 117 is connected by way of resistor 118 to line 41 and to the collector of transistor 103. The emitters of transistors 116 and 117 are connected to ground.

In operation, if the signal from unit 10a is less than the breakdown voltage of unit 106, transistor 103 is off, its collector is at the supply potential and thus line 41 is at high potential providing a "one" output. Since the collector of transistor 103 is at high potential, transistor 117 conducts, providing a voltage drop across resistor 115 so that line 42 is essentially at ground potential or "zero."

In a similar manner, transistor 101 and 102 are off. This means that the base of transistor 110 is at high potential thus conducting so that line 43 is substantially at ground potential. Since transistor 101 is not conducting, line 44 is likewise at ground potential.

When the input signal exceeds the breakdown potential of unit 106 but does not exceed the breakdown potential of units 104 and 105, transistor 103 conducts so that line 41 is at ground potential. Driving the base of transistor 117 to ground stops conduction therein so that line 42 is high. The circuit involving transistors 116 and 117 is a NOR circuit. Since transistor 102 is not conducting the transistor 112 is conducting so that its collector is substantially at ground causing transistor 116 to be nonconductive. Likewise, transistor 102 causes transistor 110 to conduct placing line 43 at ground potential. As before, transistor 101 is not conducting and line 44 remains at ground. Thus only line 42 is high.

The same circuit operation can now readily be visualized for the case where the signal exceeds the breakdown potential of unit 105 but not 104 and for the case where the input signal exceeds the breakdown potential of unit 104.

It will thus be seen that the thresholds, or breakdown potentials for units 104—106 are selected in dependence upon the desired quantizing levels.

Figure 4:
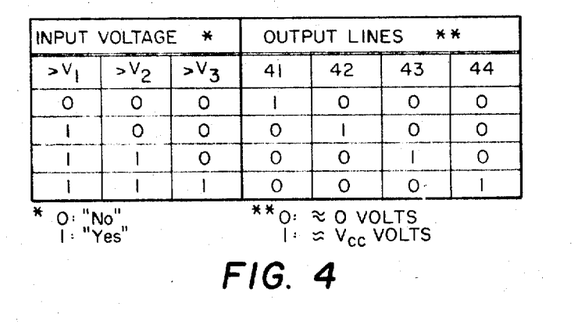
FIG. 4 is a table illustrating the operation of the circuit in FIG. 3.

FIGURE 4

As indicated in the table of FIG. 4, if the input voltage in FIG. 3 is less than the level $V_i$ of diode unit 106, then line 41 will be energized and the remainder of lines 42—44 will be deenergized. If the voltage is greater than $V_1$ and less than the level $V_2$ of diode unit 105, then line 42 only will be energized. If the voltage is greater than $V_2$ but less than the level $V_3$ of diode unit 104, then line 43 only will be energized. If the voltage is greater than $V_3$, then line 44 only will be energized. Diode units 104—106 are illustrated as Zener diodes. They differ one from another by their threshold voltages which satisfy the inequality $V_1<V_2<V_3$. They may comprise single diodes of different breakdown voltages or as, illustrated in FIG. 3, a multiplicity of like units in series.

Figure 5:
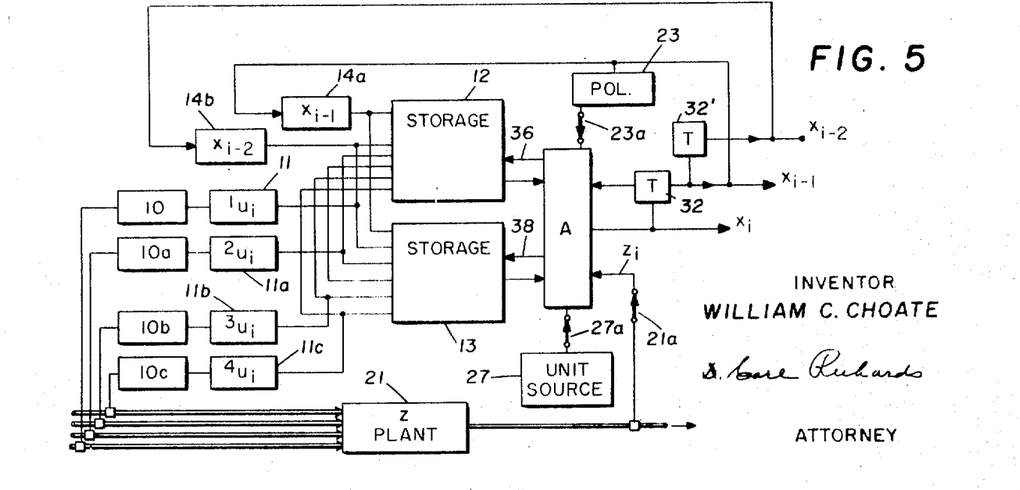
FIG. 5 illustrates a multi-input multifeedback processor in a plant identification environment.

FIGURE 5—IDENTIFICATION

In FIG. 5, an identification or simulation system is illustrated wherein four inputs for signals $^1u_i$, $^2u_i$, $^3u_i$, and $^4u_i$ are quantized in units 11, 11a, 11b, 11c, respectively, and two feedback signals, $x_{i11}$, $x_{i12}$ are quantized by units 14a and 14b, respectively, for storage in units 12 and 13. In this case, the selection of a given address in the storage units would be dependent upon coincidence between the six inputs where the system is to be trained based upon the desired output z from source 21.

The processor of FIG. 5 corresponds generally with the processor of FIG. 1 in that the unit A includes units 20, 24, 26 and 30 connected as in FIG. 1, shown for convenience as a single block in FIG. 5.

One application of the multi-input system is indicated in FIG. 5 wherein the desired output is the output from a plant 21 and the inputs to the quantizers correspond with and are derived from the four inputs to the plant 21. In this system, the processor is trained in real time in dependence upon the inputs to plant 21 and the output therefrom to simulate an output x which corresponds with the actual output z of the plant. Once trained, the switches 21a, 23a and 27a will be opened. In this condition, the four processor input signals may be varied at will to simulate an output x which would be representative of the output from the plant 21 for corresponding changes of the four input signals. In such case the response of the simulated plant to any particular change can be observed without the expenditure of time or energy necessary to effect such changes or to interfere with actual plant operation. Moreover, these observations can be effected on an accelerated time scale.

Figure 6:
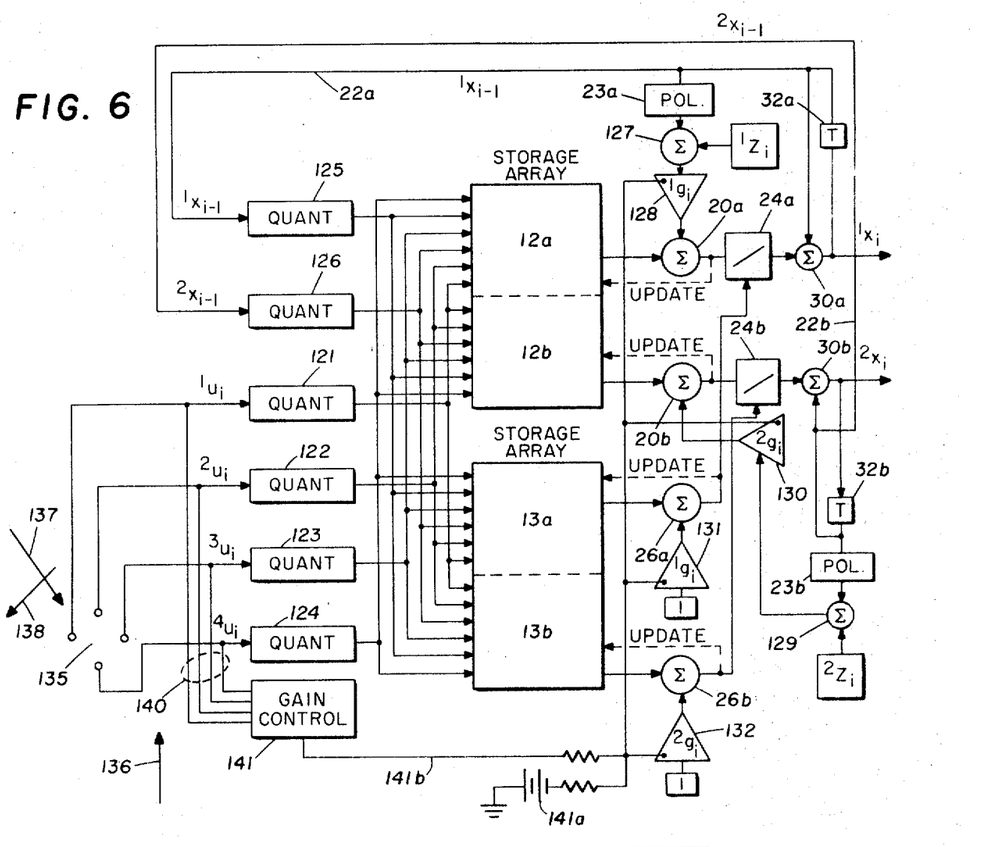
FIG. 6 illustrates a more general multi-input multi-output system embodying the invention.

FIGURE 6—CLASSIFICATION

FIG. 6 illustrates an embodiment of the present invention wherein a plurality of input signals are employed as well as a plurality of feedback signals and is further characterized by providing multiple outputs of a more general class than is possible in FIG. 5. In FIG. 5 multiple outputs can be obtained such as the outputs $x_i$, $x_{i11}$, $x_{i12}$, etc. It will be noted that the only signals applied to adders in FIG. 5 (the adders being shown in FIG. 1) are derived from units 21, 23 and 27. In FIG. 6, the two outputs $^1x_i$ and $^2x_i$ are contemporary values of the expectation of two desired outputs and may be completely independent. FIG. 6 is also more general in that it includes means for varying the strength of such signals comparable to the outputs of units 21, 23 and 27 in FIG. 5 to provide for selective emphasis of certain portions of the training operation over other portions of the training operation.

More particularly, in FIG. 6 input signals $^1u_i$, $^2u_i$, $^3u_i$, and $^4u_i$ are applied to quantizers 121—124 each of which addresses storage arrays 12a, 12b and storage arrays 13a and 13b. Quantizers 125, 126 similarly address each of storage arrays 12a and 12b and 13a and 13b in response to two feedback signals $^1x_{i11}$ and $^2x_{i11}$.

The signals retrieved from storage in response to addresses specified by the quantizers 121—126 are connected to adders as in FIG. 1 wherein feedback is employed. More particularly, the signal from storage array 12a is connected to adder 20a and the signal from storage array 12b is connected to adder 20b. The signal from storage array 13a is connected to adder 26a and the signal from storage array 13b, to adder 26b. The outputs of adders 20a and 26a are connected to divider 24a. The outputs of adders 20b and 26b are connected to divider 24b. The outputs of dividers 24a and 24b are connected to adders 30a and 30b respectively to provide the output signals $^1x_i$ and $^2x_i$, respectively. The output signal $^1x_i$ is applied to a delay unit 32a while the output $^2x_i$ is applied to delay unit 32b. The signal $^1x_{i11}$ is thus applied by way of conductor 22a to quantizer 125, to the second input of adder 30a and to a polarity inverter unit 23a. Similarly the output signal $^2x_{i11}$ is connected to the second input of adder 30b and by way of conductor 22b to quantizer 126 and to a polarity inverting unit 23b.

The output of polarity inverter unit 23a and the desired signal $^1z_i$ are connected to an adder 127 whose output is connected to the input of a variable gain amplifier 128 having a gain function $^1g_i$. The output of amplifier 128 is connected to the second input of adder 20a. Similarly, the output of complementing unit 23b and the desired signal $^2z_i$ are connected to the inputs of adder 129 whose output is connected to the input of a variable gain amplifier 130. The gain of amplifier 130 is indicated as corresponding with the function $^2g_i$. The output of amplifier 130 is connected to the second input of adder 20b. The incrementing signals applied to adders 26a and 26b similarly are maintained under the control of amplifiers 131 and 132, the gains of which are $^1g_i$ and $^2g_i$, respectively.

The system of FIG. 6, in general, will operate in the manner above described in connection with FIGS. 1 and 2. The multi-input and multi-output operation may find application in a number of different physical problems. One such problem has been indicated in FIG. 6 as comprising the identification of and distinction between two different classes of sea crafts as they travel through the region occupied by a given listening station. More particularly, the system may comprise an array 135 of marine acoustic sensors located along a waterway. The four signals from the sensors thus comprise the inputs to the quantizers 121—124. During training the desired output signal $^1z_i$ would be unity while periodically sampling the outputs from the array 135 as tugs are observed to travel along a plurality of paths 136, 137 and 138. During this training interval the desired output signal $^2z_i$ will be zero. Further, training would be carried out wherein the second desired output signal $^2z_i$ would be unity while sampling the output signals from the array 135 while detecting signals from a different class of crafts such as boats driven by an outboard motor are observed in the area of the array 135. Training would be carried out during time intervals when the craft travel at different headings and different speeds and with different species of the class of motors involved. During this training interval the desired output signal $^1z_i$ is zero.

The signals from amplifiers 128, 130, 131 and 132 would be used only in training. Thereafter, the system would operate in response to various signals detected by the array 135. Whenever a craft of the first class passes the array 135 the output $^1x_i$ would be of unity value, for example, and otherwise would be zero. Whenever a craft of the second class is in the region of the array 135, the second output $^2x_i$ would be unity but otherwise zero. If craft from both classes were present then both outputs would be unity. Thus the outputs $^1x_i$ and $^2x_i$ would provide for classification of the character of the vessels in the region of the array 135.

The foregoing example has been given by way of illustration and is intended to indicate the versatility of the processor and its operation and is not in any way limited to the particular environment, to the number of inputs employed, nor to the number of feedback elements incorporated in its operation.

It will be appreciated that if $^1g_i$ is equal to $^2g_i$ then the storage array 13b could be eliminated along with the amplifier 132 and the adder 26b. In such case the output of adder 26a would be connected to both dividers 24a and 24b.

In use of variable gain, an example is shown where the system employs the signals from the sensors in the array 135 to supply to a gain control unit 141 by way of paths 140. The gain control unit 141 preferably operates in the same manner of a squelch circuit. That is, when the signal level on line 140 is high the gain of amplifiers 128, 130, 131 and 132 is high. The operation may be visualized by noting that battery 141a normally maintains the amplifier gain low. A voltage of sign opposite that of battery 141a is produced on line 140b to raise the amplifier gain in dependence upon an average of the sum of the signals on lines 140. The output of gain control unit is then applied to each of the amplifiers 128, 130, 131 and 132 during training. When the signal amplitude is high, the gains $^1g_i$ and $^2g_i$ will be larger than when the signal amplitude is low. In such case, greater emphasis will be placed upon the error, i.e.: the difference between $^1x_i$ and $^1zz_i$, for example, when a given craft is close to the array 135 than when it is remote. That is, the training will emphasize the error when the signal-to-noise level is high. Other criteria of course could be employed in generating and applying the gain control functions such means in general being well known, and dependent upon characteristics other than amplitude. Therefore, the example above is not limiting.

Figure 7:
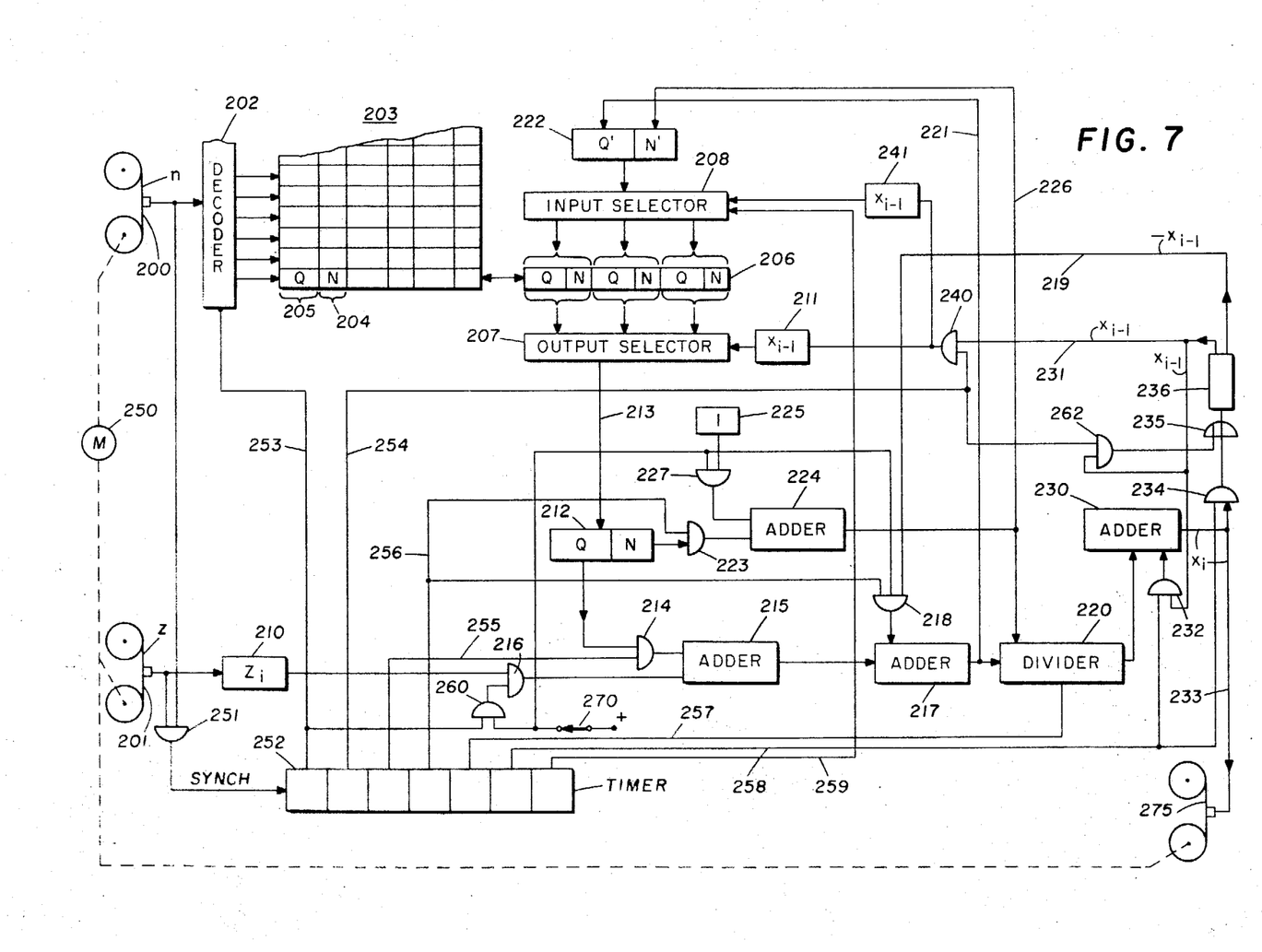
FIG. 7 illustrates a processor which trains and operates in response to digital signals.

FIGURE 7—FILTERING

FIG. 7 is an embodiment of the system in digital form generally corresponding to that of FIG. 2.

In this system the input $u$ is illustrated as having been stored on a magnetic tape 200 with the successive words on the tape representing, in digital code, the amplitude of a given input function such as for example a seismogram. The function $z$ is similarly stored on a tape 201 with the successive words representing the desired output of a filter to which the input signal $u$ is to be applied. The output of the playback head is applied to a decoder 202 with the outputs therefrom being applied to a random access memory 203. Each memory word may provide for storage of a plurality of bits as in the word segment 204 representing the number of times (N) that a given address has been accessed. The word segment 205 represents the quantity Q stored in the memory in the course of the training of the filter and, in general, will have its counterpart in the system of FIG. 2, in the charge on the capacitor such as capacitor 51. The word segment 204 will represent the number of times a given address has been accessed and will find its counterpart in the charge of capacitor 71, FIG. 2.

In operation, the successive words on tape 201 are loaded into an input register 210. In synchronism successive words on tape 200 are loaded into decoder 202. Decoder 202 is connected to the random access memory 203 by means of lines which, in general, correspond with lines 41—44 of FIG. 2. By means of this connection words in memory 203 are identified and caused to transfer to selector register 206.

As a part of the memory, a selector register 206 is provided with an output selector 207 and an input selector 208 associated therewith.

The output selector 207 is actuated by a storage register 211 in which a digital word representing the magnitude of $x_{\text{\tiny III}}$ is stored. The effect is to cause to be selected from the group of words stored in the selector register 206 that word uniquely designated by the address component from decoder 202 and the address component from function $x_{\text{\tiny III}}$.

The selected word, comprised of segments corresponding to functions Q and N is transferred to a register 212 by way of path 213. The word segment in register 212 representing a particular function Q is then applied by way of a gate 214 to an adder 215. The contents of register 210 are also applied to adder 215 by way of a gate 216. Adder 215 is connected to adder 217 to supply one input to adder 217. The second input to adder 217 is applied by way of a gate 218 which is energized at one input by the negative of $x_{\text{\tiny III}}$ appearing on path 219. Adder 217 is connected at its output as the dividend input to divider 220 and, by way of path 221, to a section in a selector input register 222. The divisor input to the divider 220 is provided at the output of adder 224 one input of which is energized by the gate 223 and the other by gate 227. One input of gate 223 is energized by the portion of the register 212 representing the stored function N. One input of gate 227 is supplied by the unity incrementing source 225. The unity source 225 is thereby connected to the second input of adder 224 through gate 227 so that the output of adder 224 as applied to the register 222 by way of path 226 represents the signal N+1.

The output of divider 220 is connected to one input of adder 230. The other input of adder 230 is supplied with a signal representing the function $x_{\text{\tiny III}}$ by way of path 231 and gate 232. The output of adder 230 appears on path 233 and represents the system output $x_i$.

The system output $x_i$ is supplied by way of a gate 234 and an OR gate 235 to a register 236. The paths 219 and 231 are connected at the outputs of register 236 to provide $x_{\text{\tiny III}}$ and the complement of $x_{\text{\tiny III}}$, respectively.

The selector register 211 is fed from register 236 by way of path 231 to a gate 240. A second selector register 241 is connected at its input to the gate 240 and, in turn, is connected to the selector 208.

The system has been illustrated with a motor 250 driving the tapes 200 and 201 with the tapes being driven in synchronism. The outputs of the playback heads are applied by way of a gate 251 to a timer 252 thereby providing a sync pulse each time words stored on the tapes 200 and 201 are reproduced. Timer 252 may be of various forms but as shown has seven outputs to provide a series of pulses on lines 253—259 seriatim. More particularly, following each sync pulse and over an interval less than the period between sync pulses each of lines 253—259 is pulsed. A first gate pulse is thus provided on line 253 from the timer output to the decoder 202 and to a gate 260 whose output is applied to gate 216. The first pulse loads the contemporary value $z_i$ of the desired output function $z$ into the adder 215 and transfers to the selector register 206 those words corresponding with that portion of the desired address represented by the output of decoder 202.

A second gate pulse on line 254 is applied to gate 240 to clock the contents of register 236 into the selector register 211. The second gate pulse also enables gate 262 thereby loading the same function $x_{\text{\tiny III}}$ back into the register 236 through gate 235.

The third gate pulse appears on line 255 to apply the contents corresponding to the function Q from register 212 to adder 215 by enabling gate 214.

In response to the fourth pulse on path 256 gate 223 is enabled to apply the function N to the adder 224 where it is incremented to give (N+1) and stored in a portion of register 222. The signal (N+1) is also applied to divider 220 in response to the fourth pulse.

The fourth gate pulse also enables gate 218 so that the complement of $x_{\text{\tiny III}}$ is applied to the adder 217 where it is summed with the output of adder 215.

The fifth pulse on line 257 actuates the divider 220 to provide an output for the input to adder 230 which is the quotient of the dividend output signal from adder 217 and the divisor output signal from adder 224.

The sixth gate pulse on line 258 enables gate 232 whereby the signal $x_{\text{\tiny III}}$ is read out of register 236 and added to the output of divider 220 thereby producing the output $x_i$. At the same time the gate 234 is enabled whereby the value $x_i$ is applied to register 236 with the timing pulse so controlled that the new signal stored in register 236 does not reach adder 230 in the contemporary clock cycle.

During the final operation the seventh pulse on line 259 enables selector 208 whereby the work stored in register 241 is placed through the selector 208 into the same address in memory register 206 as was selected by application to selector 207 of the signal $x_{\text{\tiny III}}$. The latter selection is accomplished because the function $x_{\text{\tiny III}}$ was previously stored in the register 241. The modified sequence of words in register 206 is restored in the random access memory 203 at the location originally designated by the output of decoder 202.

The foregoing description and the circuit of FIG. 7 are employed to aid in understanding the operation. In practice more sophisticated arrangements may be employed. For example it is assumed that register 236 is of such nature that reading the signals therefrom destroys its contents. However, register 236 may be of the type in which the contents are not erased but are monitored. In such case, gates 240 and 262 and registers 211 and 241 would not be required. The arrangement permits a step-by-step sequence of operations.

In general, a seismogram such as contained by tape 200 may be a record 4 or 5 seconds long with digital samples produced for each 0.001 second interval. Similarly, the desired output record z, based on a priori information as to the nature of the environment in which the record u was obtained will be of like length and sample intervals. It is to be understood that either of the seismograms u or z may be treated on the basis of a different sampling interval such as 0.002, 0.004 seconds and the like. However, having applied the records u and z to the system of FIG. 6 there will be stored in the memory 203 seismic signal words which will cause the system optimally to filter any new seismogram u' which has the same statistics as the function u. Thus, if a new record u' is applied to the decoder 202, the system will serve to filter the same. It should be noted that, in connection with a filtering operation, the functions $z_0$, the complement of $x_{i11}$, and the unity function from source 225 are employed only in training. Thus, in filtering the switch 270 will be open so that the gates 218, 227 and 260 cannot be enabled by timer 252. Under such conditions the application of an input u' will produce an optimally filtered seismogram on an output tape 275 which records the signal on the output channel 233.

The foregoing description of the system of FIG. 7 may employ serial adders. Such adders are well known in the art and may be of the type, for example, manufactured and sold by Texas Instruments Incorporated of Dallas, Texas and identified as SN7483N (a 4-bit adder), SN5482 (a 2-bit adder), and SN5480 (a 1-bit adder). Suitable parallel adders are available and are well known, as are multipliers and dividers.

As above noted classes of operations to which the optimal nonlinear processor is applicable include identification or simulation, control, filtering, smoothing, prediction, modeling, classification. While a general understanding of the various operations may exist, they will now be briefly described with the aid of FIGS. 8—12 to aid in distinguishing them. It will be found that each case involves a training phase based upon operations as above described in connection with FIGS. 1, 2, 5, 6 and 7.

IDENTIFICATION

Identification is the determination of a working model which has the same input/output relationship as the system being identified. Once obtained, this model can be used to find optimal control laws, the system's response to various trial inputs, or an analytical description of a process under study. The kinetic equations for a chemical process or the equations describing the dynamics of an airframe are examples. Thus, identification is the essential first step in control and modeling.

The training phase for identification is shown in FIG. 5. Note that the inputs to system and processor are identical and that the desired output of the processor is the actual output of the system. Identification has the convenient attribute that z(t) is available throughout execution. Thus, by multiplexing, training and execution, time-varying systems can be tracked. This would be essential in adaptive control. Also, identification has the desirable property that execution can be performed with an accelerated time scale. Thus, the response of the model to 100 points or samples of a trial u(t) might be determined between just two points of the real-time training sequence.

Figure 8:
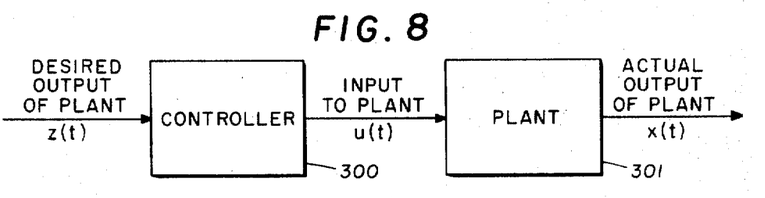
FIG. 8 diagrammatically illustrates the production of a plant controller.
Figure 9:
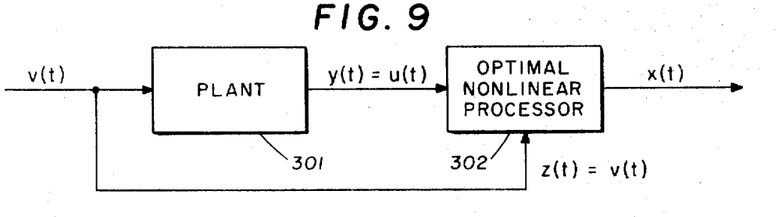
FIG. 9 diagrammatically illustrates application of the plant controller.

FIGURES 8 and 9—CONTROL

The processor may be used in control in two ways. In one, the physical system or plant is identified in real time. Simultaneously, by means of multiplexed operation, the response of the model to various trial inputs is established by executing in an accelerated time scale. By an appropriate iterative procedure, the sequence of trial inputs can be adjusted so that a selected performance index is maximized. Then this input can be applied to the plant (in real time) to effect the optimal control. In this procedure, the processor may provide the service of adaptively tracking the plant and providing a model which may be operated as fast as the system permits.

Another approach to optimal control is best explained in terms of FIGS. 8 and 9. The objective is to produce the controller 300. The latter is a system which operates on z(t) to give the u(t) which most nearly drives the plant 301 to z(t). The optimal nonlinear processor provides this by identifying the inverse of the plant 301. In general terms, the inverse $S^{11}$ of a system S has the property that, when cascaded with the system, the output of the cascaded combination is equal to the input. This is precisely what is required of the controller 300. An important property of $S^{11}$ is that it commutes with S, that is, the order of the cascaded combination is immaterial. This allows the controller to be identified as shown in FIG. 9. Note that the processor 302 is required to produce an estimate of the input to the plant 301 from its output. If the training is successful, it meets the definition of the inverse of the plant, and by the commutivity, property, FIG. 9, may then be installed as the controller 300 as shown in FIG. 8. Systems in which there is not a one-to-one relationship between the input and output sequences will not have realizable inverses. Even when a true inverse of the plant does not exist, the processor will identify the best possible approximation.

Figure 10:
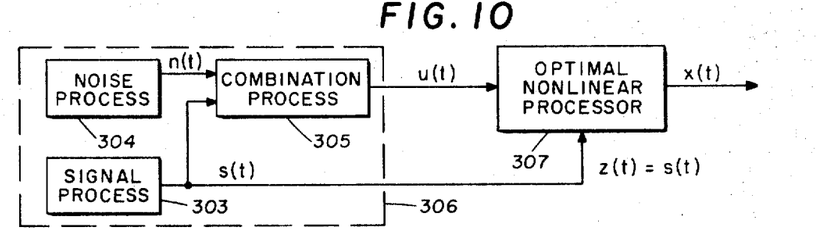
FIG. 10 diagrammatically illustrates a filtering process.

FIGURES 7 and 10—FILTERING

Filtering is of paramount importance in communications systems, tracking of airborne vehicles, navigation, secure communications, and many other applications. The objective is to estimate the present value of a signal from an input which is a function of both signal and noise. The training phase shown in detail in FIG. 7 is depicted in block form in FIG. 10. The signal process 303 and noise processes 304 may be interpreted from a purely statistical viewpoint or as the responses of dynamical systems to random excitation. The latter admits the interpretation of filtering as the estimation of the state of the signal process 303 in the presence of measurement noise using information gained from the combination process 305. For example, the signal process 303 might be a missile trajectory, the noise process 304 might be atmospheric disturbances, and the combination process 305 might be tracking system dynamics. Together, the signal, noise, and combination processes constitute what has been called the message process 306. Only when the signal and noise processes are Gaussian and the combination process linear are linear processors known to be optimum. Exceptions to these requirements occur frequently and are responsible for manifestly better performance with the optimum nonlinear processor 307.

Figure 11:
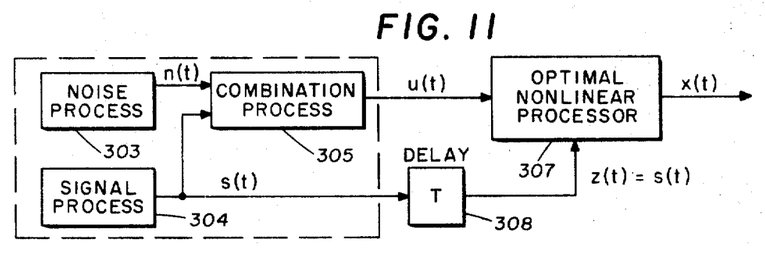
FIG. 11 diagrammatically illustrates a smoothing process.

FIGURE 11—SMOOTHING

Smoothing finds wide use in trajectory analysis, instrumentation, and in the estimation of an originating event from succeeding events. The estimation of the firing site of a mortar from radar tracking data of shell trajectory are examples. Smoothing differs from filtering in that the objective is to estimate a *past* value of the signal from the input rather than the current value. Again, the interpretation of the signal as the state of a dynamic process is useful. For example, in trajectory analysis, the state might correspond to the position coordinates of the object under study.

The training phase for smoothing closely resembles that of filtering. The only difference is that a pure time delay 308 is required between the signal and the desired output/input to the processor. Note that the desired output at time $t$ is $s(t-T)$. The delay time $T$ may be fixed or variable. As an illustration of a variable delay, $T=t$ yields an estimate of the initial value of the signal, the state of the signal process, which becomes more refined as additional data are used. This method would be employed in the mortar firing site detection problem mentioned earlier.

Figure 12:
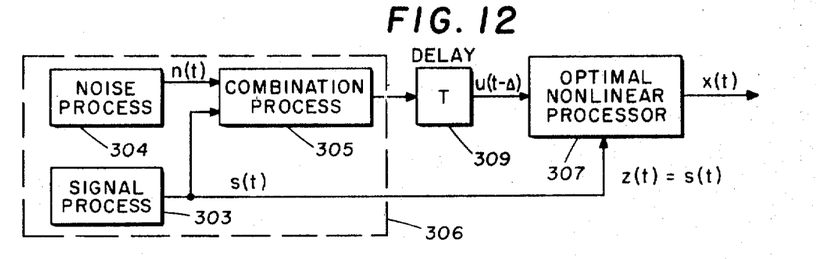
FIG. 12 diagrammatically illustrates a prediction process.

FIGURE 12—PREDICTION

Prediction is important in many areas including data and speech compression. That is if a predictor can estimate the next transmitted bit, that bit need not be transmitted—an identical predictor can be installed with a receiver to reconstruct the message.

To obtain the optimal nonlinear predictor, the processor 307 is trained in much the same manner as for filtering. But in prediction a *future*, rather than current, value of the signal is to be estimated from the input. Therefore, a pure time advance between the signal and the desired output/input to the processor is employed. But, as a pure time advance is physically unrealizable, it is necessary to use an alternate approach. The same result can be achieved with a delay 309 on the processor input as shown in FIG. 12. While the prediction estimator cannot be updated with current information as was possible in identification, it can nevertheless be continually updated as future events become known present events. Thus, the predictor can cope with nonstationary situations which vary slowly with respect to the prediction lead time. The output of the predictor is an estimate of $s(t+T)$ where, in analogy to smoothing, the lead time T can be either fixed or variable. As an illustration of a variable T, the choice $T=t_f-t$ yields an estimate of $s(t_f)$ which becomes more refined as additional data become available, i.e., as the predicted event approaches reality. This might correspond to the estimate of the impact coordinates of a missile from radar tracking signals being accumulated.

MODELING

Inasmuch as the training phase is concerned, modeling is identical to identification. The distinction between the two is based on the use made of the identified model. In modeling, the primary purpose is to gain analytical insight into the process being studied. This insight can be derived in several ways. One is to ascertain the critical inputs. To do this, certain inputs to the system being modeled are selected on the assumption they are critical to the certain outputs of interest. By using the processor to identify a system which operates on these inputs to yield these outputs, the assumption can be tested. Alternately, certain inputs and outputs may be assumed to act independently. This can be forced upon the processor and the assumption tested.

Once a satisfactory model has been obtained through identification, it may be examined or otherwise tested to reveal the mathematical and/or physical character of the system upon which it is based.

CLASSIFICATION

Classification illustrated in FIG. 6 differs from filtering in that the objective is not to estimate the signal (or a linear function of the signal) but to derive a decision based on the estimated signal. Thus, there will not be a 1:1 correspondence between the signal and desired output of the processor, but, the desired output will be some binary function of the class to which the signal belongs. A simple case is detection shown in FIG. 6 in which $$z(t) = 1, s(t) \neq 0$$
$$z(t) = 1, s(t) = 0.$$

That is, the processor estimates that the signal is present by producing a unit valued output, or that it is not present by a zero valued output.

The most general classification problem can be stated
$z_i(t)=1$, when $s(t)$ is a member of a set $S_i$
$z_i(t)=0$, when $s(t)$ is not a member of the set $S_i$
$i=1, 2$, where $S_i$ denotes a particular class of signals.

Speech recognition/interpretation is a classification operation. In this application, the processor operates on an analog speech input to produce a series of outputs which constitute a code identifying what has been said. This code could be used as an input to a computer. In this way, man/computer communications could be greatly enhanced. Language translation is a closely related problem. The time sequence constituting the input language could be classified and converted into a time sequence of code symbols which designates the meaning in the output language. Other classifications will now be apparent.

Now that the invention as embodied in different forms has been described in different fields of use it will be appreciated that the method and system have general applicability. Operations are not limited to the processing of a single valued time varying function such as described in connection with FIG. 1. They may involve processing a plurality of single valued time varying functions with latitude as to the number of feedback terms and with latitude in the complexity of the system and the method. The method may be carried out utilizing analog components and signals as in FIG. 2 or digital components and signals as in FIG. 7. It will be appreciated that the method may be performed on a general purpose digital computer operating in accordance with the teachings herein, or on the special purpose digital computer of FIG. 7 since analog operations may in general be carried out effectively in digital form. In either case, the significant economy in the storage necessary during the training and operating phase provided by the present invention obtains and it is therefore to be understood that the foregoing description is to be taken as exemplary. In most instances, the preferred mode of carrying out the invention is in the digital form but in general will be dependent upon the particular task to which the invention is to be applied.

From the foregoing it will be seen that the invention involves a training phase for producing a processed output signal optimally and, in general, in nonlinear form from an information signal which is a member of a class of signals having similar statistics. In a training phase a succession of time samples of at least one training input signal other than the information signal is selected from the class and are quantized to produce a member of each of a like succession of groups of operating signals. The operating signals partly control a gating operation which, in response to at least two members in each of the groups, will produce an independent gated training signal. Each such gated training signal is combined with a contemporary sample of the desired output signal and preferably with the negative of the previous sample of the processed output signal to produce a training summation signal. The independent gated training signal is replaced by the training summation signal in the course of each gating operation. The training summation signal is normalized to reflect the number of times that a given independent gated training signal has been selected or gated. The normalized training summation signal is then preferably combined with the previous sample of the processed output signal to form the contemporary sample of the processed output signal. The previous sample of the processed output signal is quantized to produce a second member of each of the groups which control the gating operation.

The foregoing series of steps is repeated, during training, over a statistically significant number of samples of a training input signal or signals.

In a subsequent operating phase, each of a succession of time samples of the information signal is quantized to produce a member of each of a like succession of groups of operating signals for controlling the gating operation which, in response to at least two members in each of the latter groups, will produce an independent normalized gated signal which was developed in the training phase. The contemporary normalized gated signal is then preferably combined with a previous sample of the processed output signal to form a contemporary processed output signal. At the same time the previous processed output signal is quantized to produce a second member of each of the groups of operating signals to control the gating operation. Thus, during the operating phase the quantities statistically developed during the training phase are applied in processing any signal which has generally comparable statistics as the training signal or signals.

The foregoing description has been directed to operations which may be considered to be optimum from the standpoint that the size of the memory required and the error signal experienced in training are minimized. However, it has been found that the system will operate satisfactorily in somewhat simplified form. For example, the system of FIG. 1 and counterparts thereof in the remaining figures has been found to operate satisfactorily even though two of the three feedback quantities are eliminated. More particularly, the summation unit 30 may be eliminated so that the output signal $x_i$ is the output of unit 24. That is, the feedback of the signal $x_{ui}$ shown in FIG. 1 being applied to the second input of summation unit 30 is not used. Further, the feedback path through the polarity reversing unit 23 and switch 23a may be eliminated.

The system of FIG. 1 thus modified, gives an error signal which is greater than when the latter feedback paths are employed but it is operable and permits simplification of system which in some cases may be found to be preferable. However, for a given level of performance, a larger memory is required as compared with the system which includes the feedback to summation unit 30 and to the summation unit 20 as well as to quantizer 14 from delay unit 32. Thus, the system shown in FIG. 1 and as schematically represented in FIG. 2, represents the preferred mode inasmuch as at least three feedback paths are employed, one to quantizer 14, the second to the summation unit 20, and the third to the summation unit 30.

It will be appreciated that the nature of the various components of the system of FIG. 1 may be varied depending upon the particular use of the invention. FIG. 2 illustrates an analog storage array. In digital operations magnetic storage arrays, as conventionally used in digital systems, may also be employed as well as other well-known storage systems. The summations units 20, 26 and 30 may be of conventional type. In analog operations they have been illustrated in FIG. 2 as comprising resistor networks. In digital operations they would comprise the digital counterpart of the analog, as is well known in the art. Division in divider 24 is well known and may be carried out as described by R. K. Richards in Arithmetic Operations in Digital Computers, Van Nostrand, 1955, pages 136—165. Time delay unit 32 may comprise a magnetic delay line for either analog or digital operations or may comprise a storage resistor which will receive and hold a digital work for one sample interval as shown at page 153 of the Richards text. The system components employed in the various drawings, therefore, are, in general, well known and understood. The organization of the present system provides for feedback in optimizing the processor of the present invention.

Having described the invention in connection with certain specific embodiments thereof, it is to be understood that further modifications may now suggest themselves to those skilled in the art and it is intended to cover such modifications as fall within the scope of the appended claims.

What I claim is:

1. The method of establishing an optimal nonlinear signal processor which comprises:
    a. quantizing successive time samples of an input signal $u$ to produce successive groups of operating functions for controlling a gating operation which in response to each of said groups will produce an independent gated output signal;
    b. combining said gated output signal produced in response to the contemporary input signal $u_i$ and a function of the previous output signal $x_{ui}$ with a second signal $z_i$ representative of the desired contemporary value of the response of said processor to the contemporary and past values of $u$ to produce a summation signal;
    c. in response to each said gating operation replacing said independent gated output signal by said summation signal;
    d. normalizing said summation signal to produce the contemporary value of the output signal $x_i$;
    e. quantizing said previous output signal $x_{ui}$ to produce a second of the groups of said functions to control said gating operation.

2. The method of claim 1 wherein said signals, $u$, $x$, and $z$ are in analog form.

3. The method of claim 1 wherein said signals $u$, $x$ and $z$ are in digital form.

4. The method of claim 1 wherein successive time samples of functional derivatives of said input signal $u$ and said output $x_{ui}$ are employed for further controlling said gating operation.

5. The method of claim 1 wherein said previous output signal $x_{ui}$ is subtracted from said first summation signal, and wherein said output signal $x_i$ is combined with said normalized signal.

6. Optimal nonlinear signal apparatus for processing signals comprising:
    a. at least a pair of level selectors the first of which receives said signal;
    b. a pair of storage arrays each addressed in a first coordinate by one of said selectors in response to said signal and each addressed in a second coordinate by the other of said selectors in response to an address feedback signal;
    c. a first signal loop including a first summation means which first summation means is responsive to the condition at the selected address in a first of said storage means and to a desired output signal for storing at said selected address the output of said first summation means;
    d. a second signal loop including a second summation means which second summation means is responsive to the condition at said selected address in a second of said storage means and to a weighting factor for storing at said selected address in said second storage the output of said second summation means;
    e. a third feedback loop having in tandem a divider, and a time delay with the output of said time delay connected to supply said address feedback signal to the input of the second of said level selectors;
    f. means for applying to said divider the output signals from said first and second summation means; and
    g. circuit means for extracting the processor output signal from the juncture between said divider and said time delay.

7. The method of producing a processed output signal optimally and nonlinearly from a first signal of a class of signals having similar statistics which comprises,
    i. in a training phase:
    a. quantizing successive time samples of at least one training input signal other than said first signal selected from said class to produce a member of each of successive groups of operating signals partly to control a gating operation which, in response to at least two members in each of said groups, will produce an independent gated training signal,
    b. combining each said gated training signal with a contemporary sample of the desired output signal to produce a training summation signal,
    c. in response to each said gating operation replacing said independent gated training signal by said training summation signal,
    d. normalizing said training summation signal to form the contemporary sample of said processed output signal,
    e. quantizing said previous sample of said processed output signal to produce a second member of each of said groups of said operating signals to control said gating operation, and
    ii. in a subsequent operation phase:
    f. quantizing successive time samples of said first input signal to produce a member of each of successive groups of operating signals for controlling said gating operation which, in response to at least two members in each of said groups will produce an independent normalized gated signal developed in said training phase to form the contemporary processed output signal, and g. quantizing said previous processed output signal to produce a second member of each of the groups of said operating signals to control said gating operation.

8. The method of claim 7 wherein, in said training phase, the previous sample of the processed output signal is subtracted from said training summation signal, wherein said previous sample of said processed output signal is added to the normalized training summation signal to form the contemporary sample of said processed output signal, and, in said operation phase, each previous sample of the processed output signal is added to the contemporary normalized gated signal to form the contemporary processed output signal.

9. Optimal nonlinear signal apparatus for processing signals comprising:
   a. at least a pair of level selectors the first of which receives said signal;
   b. a pair of storage arrays each being meant for addressing in a first coordinate by one of said selectors in response to said signal and in a second coordinate by the other of said selectors in response to an address feedback signal;
   c. a first signal loop including a first summation means which first summation means is responsive to the condition at the selected address in a first of said storage means and to a desired output signal for storing at said selected address the output of said first summation means;
   d. a second signal loop including a second summation means which second summation means is responsive to the condition at said selected address in a second of said storage means and to a weighting factor for storing at said selected address in said second storage the output of said second summation means;
   e. a third feedback loop having in tandem a divider and a time delay with the output of said time delay connected to supply said address feedback signal;
   f. means for applying to said divider the output signals from said first and second summation means; and
   g. circuit means for extracting the processor output signal from between said divider and said time delay.

10. Apparatus according to claim 9 wherein means are provided for subtracting the processor output signal from the output of said first summation means and for adding the processor output signal to the output of said divider.

11. The method of claim 1 wherein a nonnegative weighting function $g$ is employed selectively to emphasize said summation signal.